United States Patent

[11] 3,627,060

| [72] | Inventor | Norman Frederick Lemmon<br>Cedar Falls, Iowa |
|---|---|---|
| [21] | Appl. No. | 18,561 |
| [22] | Filed | Mar. 11, 1970 |
| [45] | Patented | Dec. 14, 1971 |
| [73] | Assignee | Deere & Company<br>Moline, Ill. |

[54] DRAFT LINK SWAY CONTROL MECHANISM
13 Claims, 8 Drawing Figs.

[52] U.S. Cl. ............................................. 172/450,
280/474, 280/446
[51] Int. Cl. .................................................. A01b 59/043
[50] Field of Search ......................................... 280/474;
172/450

[56] References Cited
UNITED STATES PATENTS
3,047,076  7/1962  Wier et al. ..................... 172/450
2,935,145  5/1960  DuShane et al. ............... 172/275
2,987,126  6/1961  Horney ......................... 172/450

OTHER REFERENCES
Albrecht; H. E., German printed application No. 1,216,600 Published May 12, 1966.

*Primary Examiner*—Leo Friaglia
*Attorneys*—H. Vincent Harsha, Harold M. Knoth, William A. Murray and John M. Nolan ABSTRACT: The draft links of a tractor carry clamplike bumpers which contact sway blocks mounted on a drawbar support on the opposite sides of the power takeoff housing. Each bumper is eccentric and tapered with respect to the longitudinal axis of the associated draft link and is clampable in positions spaced 180° about the axis to provide sway control for different hitch spacings or categories and is shiftable along the draft link to provide minor lateral adjustment.

Patented Dec. 14, 1971

INVENTOR.
N. F. LEMMON

Patented Dec. 14, 1971
3,627,060
2 Sheets-Sheet 2
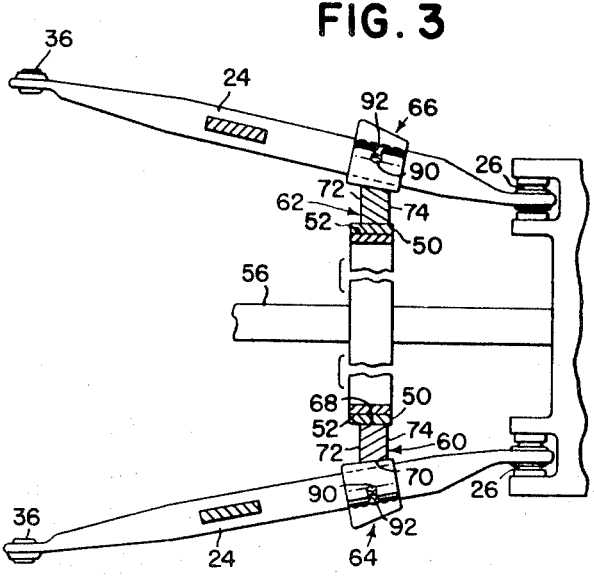
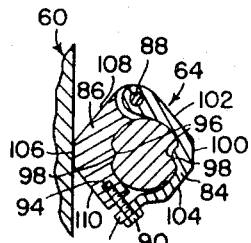
FIG. 8
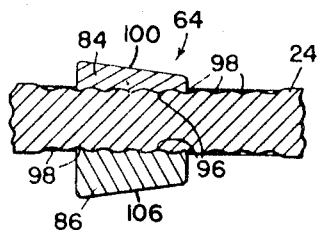
FIG. 7
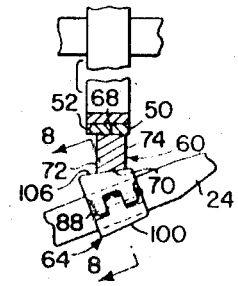
FIG. 6
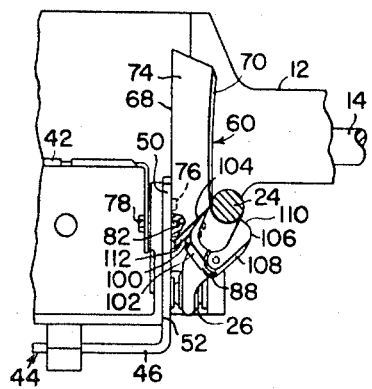
FIG. 4
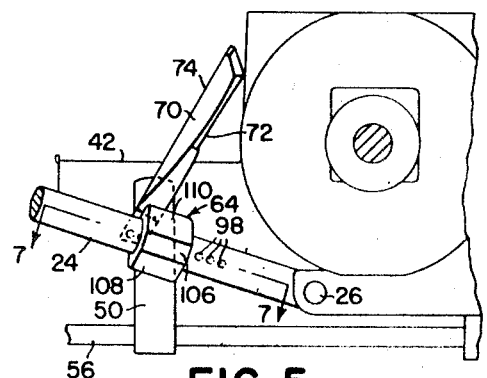
FIG. 5
INVENTOR.
N. F. LEMMON 3,627,060

DRAFT LINK SWAY CONTROL MECHANISM

BACKGROUND OF THE INVENTION

The present invention relates to a draft link sway control device and more particularly relates to a device which is an improvement over that disclosed in U. S. Pat. No. 2,987,126 issued to David C. Horney on June 6, 1961.

Sway control in the Horney device is provided by sway blocks secured to a drawbar support at the opposite sides of the power takeoff housing, the draft links bear directly on the sway blocks. Sway control for different hitch categories and for upper and/or lower positions of the draft links is provided by making the sway blocks of certain dimensions and mountable in different operable positions.

Sway block designs of this type have the disadvantages of lacking means for making minor adjustments of lateral spacing and of being limited by size and shape to strengths which are sometimes inadequate. Also, when the sway blocks are in the position allowing free sway of the draft links in their lower position, it has been found that since the surface, the drawbar support for example, which may be contacted when the draft links are free to sway, is the same for wide and narrow hitch categories, the range of sway permitted for wide hitch categories is excessive and may result in the draft links coming into contact with the rear wheels of the tractor.

SUMMARY OF THE INVENTION

According to the present invention, there is provided an improved draft link sway control device and more particularly there are provided clamplike bumpers on the draft links of a tractor for contact with sway blocks mounted on a drawbar support at the opposite sides of the power takeoff housing.

An object of the invention is to provide the draft links with eccentric bumpers which are reversible to obtain lateral adjustment for different hitch categories.

Another object is to provide bumpers which are tapered with respect to the draft links and which are axially adjustable thereon to obtain minor lateral adjustment of the draft links with respect to the sway blocks.

A further object is to provide adjustable bumpers on the draft links in combination with sway blocks which sway blocks have only one bumper contact or bearing surface and as a consequence, may be manufactured with increased strength.

Still a further object is to provide bumpers on the draft links which are adjustable to allow substantially the same range of free sway for narrow and wide hitch categories.

These and other objects will be apparent from a consideration of the specification and drawings.

BRIEF DESCRIPTION OF THE DRAWINGS

FIG. 3 is a sectional view taken along the line 3—3 of FIG. 2.

FIG. 4 is a fragmentary view, similar to FIG. 1, showing the sway blocks swung upwardly to a position wherein lateral swinging of the draft links is locked out only in the upper or transport range of vertical movement of the draft links.

FIG. 5 is a side view of the structure shown in FIG. 4.

FIG. 6 is a fragmentary view similar to FIG. 3, but showing the clamplike bumpers turned 180° to the position for preventing sway of wide category hitch implements.

FIG. 7 is a fragmentary sectional view taken along line 7—7 of FIG. 5.

FIG. 8 is a sectional view taken along line 8—8 of FIG. 6.

DESCRIPTION OF THE PREFERRED EMBODIMENT

Figure 1:
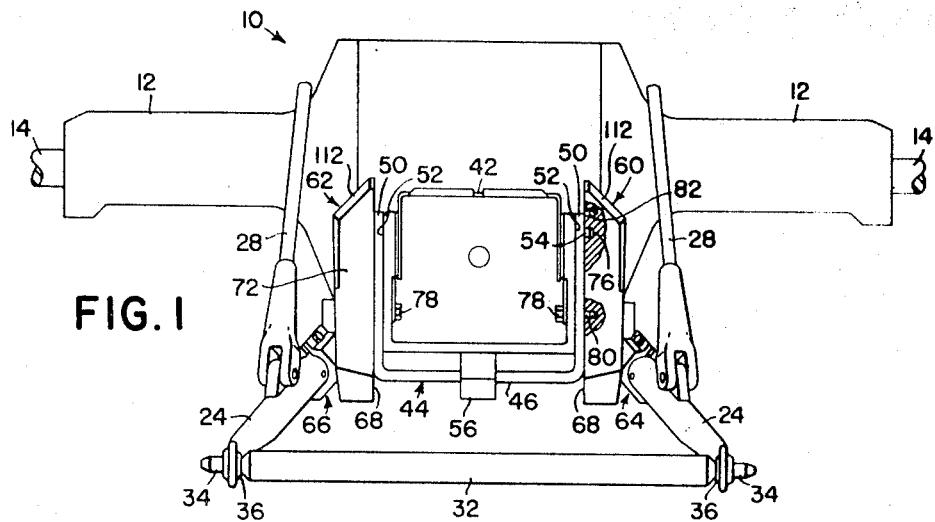
FIG. 1 is a rear view showing a portion of a tractor having a conventional three-point hitch system and provided with sway blocks and bumpers disposed such as to accommodate, firstly, an implement having a narrow category hitch, and to provide, secondly, sway prevention throughout the entire range of vertical draft link movement.
Figure 2:
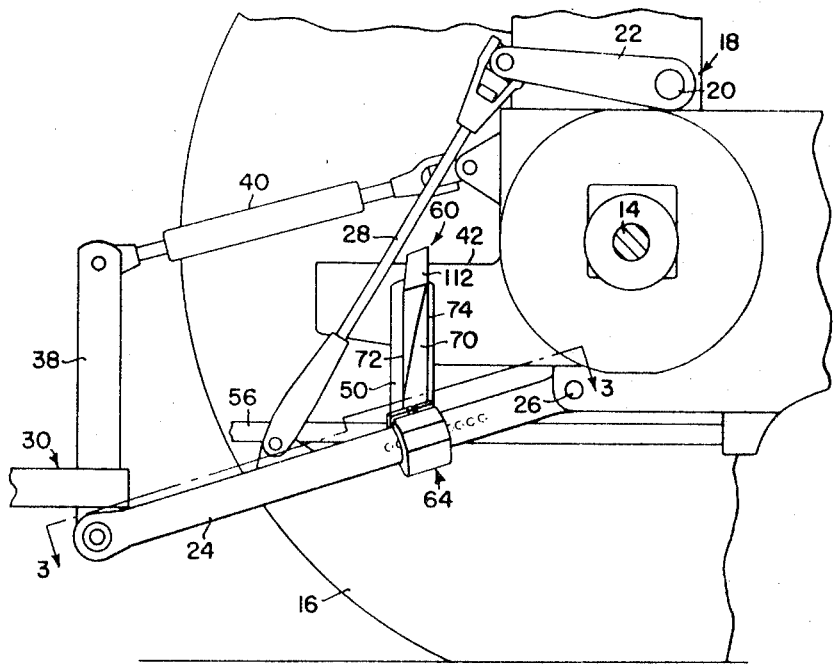
FIG. 2 is a side view of the structure shown in FIG. 1.

Referring to FIGS. 1 and 2, the tractor is indicated in its entirety by the reference numeral 10 and includes rear axle housings 12 in which axle shafts 14 are disposed, the shafts 14 carrying rear ground wheels 16. The tractor 10 also includes a power lift mechanism indicated in its entirety by reference numeral 18, the power lift mechanism including a transverse rockshaft 20 to which arms 22 are fixed. A pair of laterally spaced draft links 24 are pivoted at their forward ends to the tractor, as at 26, for generally universal movement and a pair of lift links 28 pivotally interconnect the draft links intermediate their ends with the outer ends of the arms 22. An implement 30, only the forward portion of which is shown, includes a cross-shaft 32, which has reduced ends 34 disposable in ball connectors 36 carried in the outer ends of the draft links 24. The implement 30 also includes a mast 38 which is pivotally interconnected to the tractor by a link 40.

The lower rear portion of the tractor carries a power takeoff housing 42 and a rear drawbar support 44. The drawbar support 44 is U-shaped and has a web 46 and opposite upright legs 50 arranged in overlapping relation to surfaces 52 on the housing 42 and are secured thereto by socket head screws 54. A tractor drawbar 56 is disposed between the web 46 and the housing 42.

The sway control mechanism of the present invention includes a pair of elongate right- and left-hand sway blocks 60 and 62, mounted on the opposite, outer lateral surfaces of the drawbar support 44, and includes a pair of right- and left-hand clamplike bumpers 64 and 66 carried by the draft links 24 in transverse alignment with and adapted to contact the sway blocks when the links are swung vertically between working and transport positions. The sway blocks 60 and 62 each have a planar mounting surface 68 and an opposite specially configured bearing surface 70, the surface 68 being connected to the surface 70 by opposite surfaces 72 and 74 which are generally planar and disposed at a 90° angle in contiguous relationship to the surface 68. The configuration of the surface 70 forms no part of the present invention and for details reference may be had to the above-noted U. S. Pat. No. 2,987,126 to Horney.

The sway blocks 60 and 62 may be selectively fastened to the tractor in lower (FIG. 1) or upper (FIG. 4) positions, wherein sway is respectively controlled throughout vertical swinging movement of the draft links between transport and working positions, or only in the transport position. The fastening means for fixing the sway blocks 60 and 62 in the positions shown in FIGS. 1–3, includes generally cylindrical sockets 76 in the upper portions of the mounting surfaces 68, which receive the heads of the socket head screws 54 in a dowel-fashion. The attachment of the blocks is completed by capscrews 78 that are extended through suitable openings in the drawbar support 44 and into threaded taps 80 in the midportions of the mounting surfaces 68. The sway blocks 60 and 62 may be moved to their upper operative position (FIGS. 4 and 5) by removing the capscrews 78 and reversing the sway blocks end for end by rotating them upwardly about the socket head screws 54, and reinserting the capscrews 78 through suitable openings in the drawbar support and into threaded taps 82 near the end of the surfaces 68.

The clamplike bumpers 64 and 66 are each constructed in opposite halves 84 and 86 interconnected by a hinge connection 88. The bumpers encircle the draft links 24 and are clamped thereon by clamping bolts 90 inserted through slots 92 in the free ends of the bumper halves 84 and threaded into threaded taps 94 in the free ends of the bumper halves 86. In order to prevent the bumpers from rotating about or sliding along the draft links 24, the insides of the bumpers are provided with diametrically opposite rows of protrusions 96 which engage corresponding depressions 98 in the draft links 24.

The bumpers 64 and 66 provide means for selectively adopting the sway control to different (wide and narrow)

hitch categories. To this end, the bumper halves 86 are thicker in cross section than the bumper halves 84 (FIG. 8). Thus, the bumpers are each eccentric to the longitudinal axis of the associated draft link 24, and sway control for narrow hitch categories is obtained by mounting the bumpers so that the halves 84 are inward (FIGS. 1–5), while sway control for wide hitch categories is obtained by mounting the bumpers so that the halves 86 are inward (FIGS. 6 and 8). Small lateral adjustments in each operative position of the bumpers 62 and 64 are possible by moving the bumpers axially along the draft links 24 since the bumpers are tapered outwardly from their front to their rear ends (FIG. 7).

The exteriors of the bumpers 64 and 66 are specially configured to cooperate with the sway blocks 60 and 62 when the latter are in their upper position (FIGS. 4 and 5). The halves 84 have intermediate vertical planar bearing surfaces 100, from which contiguous planar ramp surfaces 102 and 104 diverge to the hinge connections and clamping bolt connections, respectively. Similarly, the bumper halves 86 have intermediate planar bearing surfaces 106 from which contiguous, planar ramp surfaces 108 and 110 diverge to the hinge connections and clamping bolt connections respectively. When the bumpers are positioned for preventing sway during transport of implements having narrow category hitches (FIGS. 4 and 5), the ramp surfaces 104 of the bumper halves 84 contact upwardly and outwardly inclined bottom surfaces 112 of the sway blocks 60 and 62 (FIG. 4) as the draft links are swung upwardly to the transport position, and act to guide the bumpers outwardly until the bearing surfaces 100 are in contact with the bearing surfaces 70 of the sway blocks. The ramp surfaces 108 of the bumper halves 86 serve a similar function when the bumpers are positioned for preventing sway in transport of implements having wide category hitches (FIGS. 6 and 8) and the sway blocks 60 and 62 are positioned as in FIGS. 4 and 5. It is to be noted that while the bumpers 64 and 66 are right- and left-hand, they may be interchanged on the draft links and when interchanged the ramp surfaces 102 and 110 of the bumper halves 84 and 86, respectively, will function in a manner corresponding to the function of the ramp surfaces 104 and 108.

The operation set forth in the description above, is summarized as follows:

Sway control is provided throughout the range of vertical swinging movement of the draft links 24 by positioning the sway blocks 60 and 62 in their lower position (FIGS. 1–3), while sway control is provided only in the transport position of the draft links 24 by positioning the sway blocks in their upper position (FIGS. 4 and 5). The sway blocks 60 and 62 may be moved from their lower to their upper position by removing the capscrews 78 and rotating the sway blocks upwardly about the socket head screws 54 until the ends of the sway blocks are reversed and then reinserting the capscrews 78 in the appropriate openings for retaining the sway blocks in their upper position. Sway control for implements having different hitch categories is provided by the clamplike, eccentric bumpers 64 and 66. If sway control for an implement having a wide category hitch is desired, the bumpers 64 and 66 are clamped in the position wherein the halves 86 are disposed inwardly (FIGS. 6 and 8) with the bearing surfaces 106 adjacent the bearing surfaces 70 of the sway blocks 60 and 62, and if sway control for an implement having a narrow category hitch is desired, the bumpers 64 and 66 are clamped in the position wherein the halves 84 are disposed inwardly with the bearing surfaces 100 adjacent the bearing surfaces 70 of the sway blocks 60 and 62. The bumpers 64 and 66 are moved from the first to the second described position by merely removing the clamping bolts 90, rotating the bumpers 180° about the longitudinal axes of the draft links 24, and then reinserting the clamping bolts. It should also be noted that the desired adjustment may also be made without rotating the bumpers by moving the bumpers to the opposite draft link.

Minor lateral adjustments are made by loosening the clamping bolts 90 and sliding the bumpers axially on the draft links 24. Adjustment is due to the tapered shape of the bumpers, and if the bumpers are moved toward the tractor, the draft links are spaced further apart when they are centered with the bearing surfaces of the bumpers against the sway blocks. Shifting the bumpers away from the tractor results in the draft links being spaced closer together when they are centered.

The bumpers 62 and 64 each have two ramp surfaces 102–104 and 108–110 respectively, one of which, according to the disposition of the bumpers, engages the bottom surfaces 112 of the sway blocks when the sway blocks are in their upper position and the draft links are being raised from their free swaying lower position to their upper transport position, wherein sway is locked out. For example, if the bumpers are positioned with their halves 84 inwardly (FIGS. 4 and 5), as the draft links 24 are raised, the ramp surface of the bumper on whichever of the draft links is inwardly directed, will contact the included surface 112 of the respective sway block and guide the draft links to the center position wherein the bearing surfaces 100 of the bumpers will be in engagement with the bearing surfaces 70 of the sway blocks 60 and 62.

I claim:

1. In an implement hitch for a tractor having a pair of laterally spaced draft links connected for lateral and vertical swinging movement relative to the tractor and having inwardly facing, opposed surfaces, a sway control mechanism including opposite, generally upright, laterally outwardly facing bearing surfaces on the tractor between the draft links and a pair of bumpers including contact surfaces, being adjustably mounted on said draft links for selectively disposing selected portions of said contact surfaces in operative positions in confronting relationship to said bearing surfaces, the dimensions of said bumpers being such that their respective contact surface portions, when respectively in said operative positions, bear different spatial relationships relative to said inwardly facing surfaces of said draft links.

2. The invention defined in claim 1 wherein the draft links each have a generally longitudinal central axis; said contact surfaces being inclined relative to said axes and the bumpers being adjustable in a direction parallel to said axes whereby minor distances of lateral sway control is effected.

3. The invention defined in claim 2 wherein the draft links are generally circular in cross section and the bumpers are removably fixed thereabout and are eccentric to the longitudinal axis of the respective draft links and are angularly adjustable to selected positions about the axis whereby sway control for implements of different hitch categories is effected.

4. The invention defined in claim 3 wherein the bumpers are clamplike having halves of different thicknesses in transverse cross section and means hingedly interconnecting the halves at one of their ends for pivotal movement and means for releasably securing the other ends of each half together.

5. The invention defined in claim 4 wherein each bumper half has an outer, central, generally vertical contact surface and a pair of ramp surfaces contiguous with and diverging from said central contact surface.

6. The invention defined in claim 1 wherein the draft links are generally circular in cross section and the bumpers are removably fixed thereabout and are eccentric to the longitudinal axis of the respective draft links and are angularly adjustable to selected positions about the axis whereby sway control for implements of different hitch categories is effected.

7. The invention defined in claim 6, wherein the bumpers are clamplike having halves of different thicknesses in transverse cross section and means hingedly interconnecting the halves at one of their ends for pivotal movement and means for releasably securing the other ends of each half together.

8. The invention defined in claim 7, wherein each bumper half has an outer, central, generally vertical contact surface and a pair of ramp surfaces contiguous with and diverging from said central contact surface.

9. The invention defined in claim 8 and further including a pair of laterally spaced sway blocks mounted on said tractor between the draft links, said bearing surfaces being formed on said sway blocks and said sway blocks being selectably mountable in the lower position wherein a selected vertical bearing surface of said bumpers contacts the bearing surfaces of said sway blocks throughout the range of vertical swinging of the draft links and an upper position wherein the bumper bearing surfaces contact the bearing surfaces of the sway blocks only when the draft links are raised to the transport position.

10. The invention defined in claim 9, wherein the bottom ends of the sway blocks, in their upper position are inclined upwardly and outwardly to merge with said bearing surfaces and wherein the ramp surfaces of said bumpers contact said bottom end when the draft links are swung upwardly in the transport position whereby the draft links are guided to a central transport position with the selected bearing surfaces of the bumpers in engagement with the bearing surfaces of said sway blocks.

11. The invention defined in claim 7, wherein the bumpers each have inner protrusions and the draft links have corresponding depressions for receiving the protrusions when the bumpers are in clamping engagement with the draft links whereby the bumpers are prevented from rotating around or shifting along the draft links.

12. The invention defined in claim 1, and further including a pair of laterally spaced sway blocks mounted on said tractor between the draft links, said bearing surfaces being formed on said sway blocks and said sway blocks being selectably mountable in a lower position wherein the bumpers contact the bearing surfaces throughout the range of vertical swinging of the draft links and an upper position wherein the bumpers contact the bearing surfaces only when the draft links are raised to the transport position.

13. The invention defined in claim 12 wherein the bottom ends of the sway blocks, in their upper position are inclined upwardly and outwardly to merge with said bearing surfaces and wherein said bumpers each have a complementary inclined ramp surface for contacting said bottom end when the draft links are swung upwardly in the transport position whereby the draft links are guided in a central transport position with the bumpers in engagement with said bearing surfaces.

* * * * *

Notice of Adverse Decision in Interference

In Interference No. 98,120 involving Patent No. 3,627,060, N. F. Lemmon, DRAFT LINK SWAY CONTROL MECHANISM, final judgment adverse to the patentee was rendered Nov. 8, 1973, as to claim 1.

[*Official Gazette February 26, 1974.*]